US006765930B1

(12) United States Patent
Oikawa

(10) Patent No.: US 6,765,930 B1
(45) Date of Patent: Jul. 20, 2004

(54) DECODING APPARATUS AND METHOD, AND PROVIDING MEDIUM

(75) Inventor: Yoshiaki Oikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/454,788

(22) Filed: Dec. 3, 1999

(30) Foreign Application Priority Data

Dec. 11, 1998 (JP) ........................................ P10-352978

(51) Int. Cl.[7] ........................... H04J 13/00; H04J 13/02

(52) U.S. Cl. ....................... 370/479; 370/431; 370/441; 370/442; 370/464; 370/477; 370/478; 370/480; 370/498

(58) Field of Search ................................ 370/203, 431, 370/441, 442, 464, 477, 478, 479, 480, 498

(56) References Cited

U.S. PATENT DOCUMENTS 4,180,779 A * 12/1979 Hook et al. .................. 329/50
5,264,846 A 11/1993 Oikawa ........................ 341/76
5,400,433 A 3/1995 Davis et al.
5,438,643 A 8/1995 Akagiri et al. ............... 395/2.1
5,583,962 A * 12/1996 Davis et al. ............... 395/2.38
5,608,713 A 3/1997 Akagiri et al. .............. 369/124
5,758,316 A 5/1998 Oikawa et al. ............. 704/230
6,011,824 A 1/2000 Oikawa et al. ............. 375/377
6,236,848 B1 * 5/2001 Igarashi et al. ............. 455/341
6,480,503 B1 * 11/2002 Yamaguchi et al. ........ 370/441

* cited by examiner

*Primary Examiner*—Hassan Kizou
*Assistant Examiner*—Joe Logsdon
(74) *Attorney, Agent, or Firm*—Sonnenschein, Nath & Rosenthal LLP

(57) ABSTRACT

The invention reduces the circuit scale of a decoding apparatus for decoding input signals of multiple channels. A code string inputted to a code string resolver is resolved into signal components which are applied to signal component decoders for corresponding channels. The signal components decoded by the signal component decoders are applied to an adder and then added together. The added signal component is subjected to an inverse spectrum transform by an inverse spectrum transformer and then outputted.

4 Claims, 9 Drawing Sheets

DECODING APPARATUS AND METHOD, AND PROVIDING MEDIUM

BACKGROUND OF THE INVENTION

1. Field of the Invention

The present invention relates to a decoding apparatus and method, and a providing medium. More particularly, the present invention relates to a decoding apparatus and method with which the circuit scale is reduced by performing a frequency-time transform after adding signal frequency components together, and a providing medium for providing a program to execute the decoding method in the decoding apparatus.

2. Description of the Related Art

As acoustic data coding systems, transform coding and subband coding, for example, are available. In the transform coding, a signal on the time base is blocked into frames in units of predetermined time, and the signal on the time base for each frame is transformed (spectrum-transformed) into another signal on the frequency base and divided into a plurality of frequency bands, followed by coding for each frequency band. In the subband coding, acoustic data on the time base is divided into a plurality of frequency bands without being divided into frames in units of predetermined time, and is then coded for each frequency band.

Also, a combined coding system of the transform coding and the sub-band coding is proposed. In such a combined coding system, after dividing acoustic data on the time base into a plurality of frequency bands by the subband coding, a signal for each band is spectrum-transformed into another signal on the frequency base, and coding is performed on each signal resulting from the spectrum transform.

A polyphase quadrature filter (PQF), for example, is known as a band dividing filter for use in the subband coding. The PQF has such a feature that it can divide a signal into a plurality of bands with an equal width at a time, and does not generate the so-called aliasing when the divided bands are combined together later.

Further, the above-mentioned spectrum transform for transforming a signal on the time base into another signal on the frequency base is performed, e.g., by dividing acoustic data into frames in units of predetermined time, and carrying out a discrete Fourier transform (DFT), discrete cosine transform (DCT), modified discrete cosine transform (MDCT) or the like for each frame.

Quantizing a signal thus divided with a filter or spectrum transform for each band makes it possible to control the band in which quantization noise occurs. In other words, coding can be made with higher efficiency on the auditory sense by utilizing masking effects, etc. By normalizing a signal component for each band based on a maximum value from among absolute values of signal components prior to the quantization, coding can be achieved with even higher efficiency.

When quantizing each of frequency components (hereinafter referred to as spectral components) divided into a plurality of frequency bands, a band width used for band division is set in consideration of, e.g., the human auditory characteristics. Specifically, acoustic data is generally divided into a plurality of frequency bands (e.g., 25 bands) whose width increases as the frequency increases up to a high frequency band called the critical band. Then, coding of data for each band is performed with bit allocation in predetermined number to each band or bit allocation in number adaptively changed for each band (adaptive bit allocation). In the case of coding, for example, coefficient data obtained by the MDCT processing with the adaptive bit allocation, the coding is performed with bits allocated in number adaptive to the coefficient data for each band obtained by the MDCT processing in units of frame.

The bit allocation is made, for example, based on the magnitude of a signal for each band. With this method, flat quantization noise spectra are obtained and the noise energy is minimized. However, since the masking effects are not utilized, an actual noise feeling is not always optimum on the auditory sense.

As another bit allocation method, there is known fixed bit allocation wherein auditory sense masking is utilized to obtain a required signal to noise ratio for each band. With this method, however, since the bit allocation is fixed even when a characteristic value is measured with a sine wave input, the characteristic value may not exhibit a very good value.

In order to solve those problems with the bit allocation, a high-efficiency coding system is proposed wherein all bits available for the bit allocation are divided into bits which are used for fixed bit allocation pattern determined in advance for each band or block that is obtained by further dividing each band, and bits which are used for bit allocation depending on the magnitude of a signal for each block. Further, the dividing ratio between the former and latter bits is determined based on properties of an input signal, for example, so that the number of bits allocated to the fixed bit allocation pattern is increased as the spectral distribution of the input signal becomes smoother.

With the above method, when energy is concentrated in a particular spectral component such as when a sine wave is inputted, a relatively large number of bits are allocated to the block which includes the spectral component. As a result, the overall signal to noise ratio characteristic can be improved. Generally, since the human auditory sense is very sensitive to a signal having a steep spectral distribution, an improvement of the signal to noise ratio by employment of the above method is effective in improving not only a numerical value as a result of the measurement, but also the sound quality perceived by the auditory sense.

Many other various methods than described above have also been proposed, and the model regarding the auditory sense has been developed in a finer manner.

In the case of employing the DFT or DCT as a method for spectrum-transforming a waveform signal made up of waveform elements (sample data), such as a digital audio signal in time domain, the signal is blocked for each of a number M of sample data, and the spectrum transform is performed for each block using the DFT or DCT. As a result of the spectrum transform for each block, a number M of real number data (coefficient data obtained by the DRT or MDCT processing) independent of one another are obtained. The number M of real number data thus obtained are quantized and then coded to provide coded data.

When decoding the coded data, obtained by the above-described coding process, to reproduce a waveform signal, the coded data is decoded and then dequantized to obtain real number data. The real number data is subjected to an inverse spectrum transform using, e.g., inverse DFT or DCT, for each block corresponding to the block in the coding process, thereby obtaining a waveform element signal. The blocks each represented by the waveform element signal are connected to each other to produce a waveform signal.

The produced waveform signal may be sometimes not satisfactory on the auditory sense because connection distortions occurs upon connection of the blocks and remain in the signal. To lessen the connection distortions between the blocks, the spectrum transform employing the DFT or DCT is usually performed for coding with a number M1 of sample data shared by each of both adjacent blocks in overlapped fashion.

However, when the spectrum transform is performed with a number M1 of sample data shared each of both adjacent blocks in overlapped fashion, a number M of real number data is obtained in average for a number (M–M1) of sample data. This means that the number of real number data obtained by the spectrum transform is larger than the number of sample data actually used in the spectrum transform. Such a fact that the number of real number data obtained by the spectrum transform is larger than the number of actual sample data is not satisfactory from the point of coding efficiency.

On the other hand, in the case of employing the MDCT as a method for spectrum-transforming a waveform signal made up of sample data, such as a digital audio signal, the spectrum transform is performed using a number 2M of sample data with a number M of sample data shared by each of both adjacent blocks in overlapped fashion for the purpose of lessening connection distortions between the blocks. A number M of real number data (coefficient data obtained by the MDCT processing) independent of one another is thereby obtained. In the spectrum transform employing the MDCT, therefore, a number M of real number data is obtained in average for a number M of sample data. This results in more efficient coding than the case of employing the DFT or DCT for spectrum transform.

When decoding the coded data which has been obtained by spectrum-transforming sample data with the MDCT and then quantizing the transformed real number data, the coded data is decoded and then dequantized to obtain real number data. The real number data is subjected to an inverse spectrum transform using inverse MDCT, thereby obtaining waveform elements in each block. The waveform elements in each block are added while interfering with each other to reconstruct a waveform signal.

FIG. 5 is a block diagram showing a configuration of one example of a coding apparatus for coding data by the method described above. A coding apparatus 1 shown in FIG. 5 intends to code acoustic data of five channels. The acoustic data to be coded is inputted to spectrum transformers 2-1 to 2-5 (hereinafter referred to simply as a spectrum transformer 2 when it is not required to distinguish the individual spectrum transformers 2-1 to 2-5 from each other; this is also applied to other components). The spectrum transformer 2 transforms the inputted acoustic data into signal frequency components, and outputs the signal frequency components to corresponding ones of quantization accuracy decision units 3-1 to 3-5 and normalization/quantization units 4-1 to 4-5.

The quantization accuracy decision units 3 output respective quantization accuracy information to the corresponding the normalization/quantization units 4-1 to 4-5, as well as to a code string generator 5. The normalization/quantization unit 4 performs normalization and quantization of the signal frequency components applied from the spectrum transformer 2 in accordance with the quantization accuracy information applied from the quantization accuracy decision unit 3.

The normalization/quantization unit 4 outputs normalization coefficient information and coded signal frequency components to the code string generator 5. The code string generator 5 generates and outputs a code string based on signals applied respectively from the quantization accuracy decision units 3-1 to 3-5 and the normalization/quantization units 4-1 to 4-5.

FIG. 6 is a graph for explaining a coding process performed by the coding apparatus 1 shown in FIG. 5. Acoustic data inputted to the spectrum transformers 2 is transformed into a total 64 of spectrum signal components ES for each frame in units of predetermined time. These 64 spectrum signal components ES are divided into five groups, i.e., bands b1 to b5 having predetermined widths (the group being referred to as a coding unit hereinafter). The normalization and quantization are performed on each coding unit in the normalization/-quantization unit 4.

The bandwidth of each coding unit is set to become narrower on the low frequency side and wider on the high frequency side. Such a band division is effective in suppressing the occurrence of quantization noise in match with the human auditory characteristics. In FIG. 6, levels of absolute values of spectrum signals (frequency components) obtained by the MDCT processing are indicated in terms of decibel values.

FIG. 7 is a representation for explaining a code string generated by the coding apparatus 1 shown in FIG. 5. The code string shown in FIG. 7 is made up of coding unit information U1–U5 corresponding to the five coding units shown in FIG. 6. The coding unit information U1 is made up of quantization accuracy information, normalization coefficient information, and signal component information SC1 to SC8.

The quantization accuracy information is outputted from the quantization accuracy decision unit 3, and the normalization coefficient information is outputted from the normalization/-quantization unit 4. The signal component information SC1 to SC8 correspond to the spectrum signals ES. Because eight spectrum signals ES are included in the band b1 (i.e., the coding unit U1), there are a total 8 of signal component information SC1 to SC8 as shown in FIG. 7.

The other coding unit information U2 to U5 each also have a similar makeup as the coding unit information U1. The code string having the above-described makeup is recorded on a recording medium such as an optical disk or is transmitted through a transmission line. If the quantization accuracy information is zero (0) as shown at the coding unit information U4 in FIG. 7, this means that the coding unit information U4 is not in fact coded.

FIG. 8 is a block diagram showing a configuration of a decoding apparatus for decoding a code string generated by the coding apparatus 1. A decoding apparatus 11 shown in FIG. 8 is intended to decode acoustic data of five channels and output them as acoustic data of one channel. The code string transmitted from the coding apparatus 1 is inputted to a code string resolver 12 in the decoding apparatus 11. The code string resolver 12 resolves the inputted code string into data of five channels. The resolved data of five channels are supplied to corresponding signal component decoders 13-1 to 13-5.

The signal component decoder 13 decodes signal components based on the quantization accuracy information, the normalization coefficient information, and the signal component information all supplied from the code string resolver 12, and then outputs the decoded signal components to corresponding inverse spectrum transformers 14-1 to 14-5. The inverse spectrum transformer 14 carries out an inverse spectrum transform of the applied signal components to produce acoustic data.

The respective produced acoustic data are added together by an adder 15 and then outputted. In this way, acoustic data of five channels are outputted as acoustic data of one channel.

FIG. 9 is a block diagram showing a configuration of a decoding apparatus for decoding acoustic data of five channels and outputting them as acoustic data of two channels. In a decoding apparatus 11 shown in FIG. 9, respective acoustic data outputted from inverse spectrum transformers 14-1 and 14-2 are added together by an adder 16-1 and then outputted. Also, respective acoustic data outputted from inverse spectrum transformers 14-3 to 14-5 are added together by an adder 16-2 and then outputted.

When reproducing acoustic data of five channels with five speakers, the acoustic data outputted from the inverse spectrum transformers 14 are supplied to the corresponding speakers. For example, the acoustic data outputted from the inverse spectrum transformer 14-1 is supplied to the speaker located in a front right position of a user, and the acoustic data outputted from the inverse spectrum transformer 14-2 is supplied to the speaker located in a rear right position of the user. Further, the acoustic data outputted from the inverse spectrum transformers 14-1 to 14-5 are supplied respectively to the speakers located in a front left position, a rear left position and a front central position of the user.

When the acoustic data outputted from the inverse spectrum transformers 14-1 to 14-5 are assigned to the respective speakers as described above, stereophonic sound reproduction is realized in the decoding apparatus 11 of FIG. 9 by supplying an output from the adder 16-1 to the speaker located in the front right position of the user and supplying an output from the adder 16-2 to the speaker located in the front left position of the user.

The above description concerns the case wherein a signal inputted to the coding apparatus 1 is an acoustic signal which is assumed to be reproduced by supplying output signals of the decoding apparatus 11 to a plurality of speakers.

In addition, an input signal to the coding apparatus 11 is also often processed to provide code strings as a plurality of independent acoustic signals (the so-called objects which will be referred to as acoustic objects hereinafter). After receiving the code strings, the decoding apparatus 11 decodes respective acoustic data and mixes them into channels corresponding to the desired number of speakers. Also, the code strings can be added with information indicating how respective decoded acoustic data are mixed and outputted.

The above-described decoding apparatus 11 requires each five units of signal component decoders 13 and inverse spectrum transformers 14 for decoding a code string which has been produced by coding five input signals (corresponding to five speakers located in the front right, rear right, front left, rear right and front central positions).

Also, when an input signal to the coding apparatus 1 is processed to provide a plurality of acoustic objects, the signal component decoders 13 and the inverse spectrum transformers 14 are required in number corresponding to the number of acoustic objects.

The inverse spectrum transformers 14 occupy a considerable proportion of circuits in the decoding apparatus 11, and an increase in number of the inverse spectrum transformers 14 requires a greater memory capacity and a larger amount of computations in the decoding apparatus 11. Accordingly, there has been such a problem that the overall circuit scale of the decoding apparatus 11 is increased when the decoding apparatus 11 is intended to code an acoustic signal which is assumed to be reproduced with a plurality of speakers, or when it is intended to code an input signal into a plurality of acoustic objects.

SUMMARY OF THE INVENTION

In view of the above-described situations in the art, an object of the present invention is to reduce the circuit scale of a decoding apparatus by performing a frequency-time transform after adding signal frequency components together.

A decoding apparatus according to a first aspect of the present invention comprises a receiving unit for receiving the code string; a resolving unit for resolving the code string received by the receiving unit into signals of m channels; an output unit for outputting respective signal frequency components from the signals of m channels resolved by the resolving unit; an adding unit for adding the signal frequency components of m channels outputted from the output unit and outputting the signal frequency components as signals of n channels less than the m channels; and a transforming unit for carrying out a frequency-time transform on each of the combined signal frequency components of n channels outputted from the adding unit.

A decoding method according to a second aspect of the present invention comprises a receiving step of receiving the code string; a resolving step of resolving the code string received in the receiving step into signals of m channels; an output step of outputting respective signal frequency components from the signals of m channels resolved in the resolving step; an adding step of adding the signal frequency components of m channels outputted from the output step and outputting the signal frequency components as signals of n channels less than the m channels; and a transforming step of carrying out a frequency-time transform on each of the combined signal frequency components of n channels outputted from the adding step.

A providing medium, according to a third aspect of the present invention, for providing a computer-readable program to a decoding apparatus, thereby rendering the decoding apparatus to execute processing which comprises a receiving step of receiving the code string; a resolving step of resolving the code string received in the receiving step into signals of m channels; an output step of outputting respective signal frequency components from the signals of m channels resolved in the resolving step; an adding step of adding the signal frequency components of m channels outputted from the output step and outputting the signal frequency components as signals of n channels less than the m channels; and a transforming step of carrying out a frequency-time transform on each of the combined signal frequency components of n channels outputted from the adding step.

With the decoding apparatus, the decoding method and the providing medium according to the first, second and third aspects of the present invention, a received code string resolved into signals of m channels and respective signal frequency components are outputted from the resolved signals of m channels. The outputted signal frequency components of m channels are added to provide signals of n channels less than the m channels. A frequency-time transform is then carried out on each of the added signals of n channels.

DESCRIPTION OF THE PREFERRED EMBODIMENTS

Preferred embodiments of the present invention will be described below. Prior to starting a description, for clarifying the correlation between various means recited in Claims and components used in the embodiments, the features of the present invention are summarized while corresponding components used in one embodiment are added in parentheses following the various means. As a matter of course, the summary should not be construed as limiting the various means to the components in the embodiment. Also, the components in the embodiment corresponding to those in the related art are denoted by the same numerals and are not described here unless specifically required.

A decoding apparatus according to the first aspect (corresponding to claim 1) of the present invention comprises receiving means (e.g., a code string resolver 12 in FIG. 1) for receiving said code string; resolving means (e.g., the code string resolver 12 in FIG. 1) for resolving said code string received by said receiving means into signals of m channels; output means (e.g., signal component decoders 13 in FIG. 1) for outputting respective signal frequency components from the signals of m channels resolved by said resolving means; adding means (e.g., an adder 21 in FIG. 1) for adding the signal frequency components of m channels outputted from said output means and outputting the signal frequency components as signals of n channels less than the m channels; and transforming means (e.g., an inverse spectrum transformer 22 in FIG. 1) for carrying out a frequency-time transform on each of the combined signal frequency components of n channels outputted from said adding means.

Figure 1:
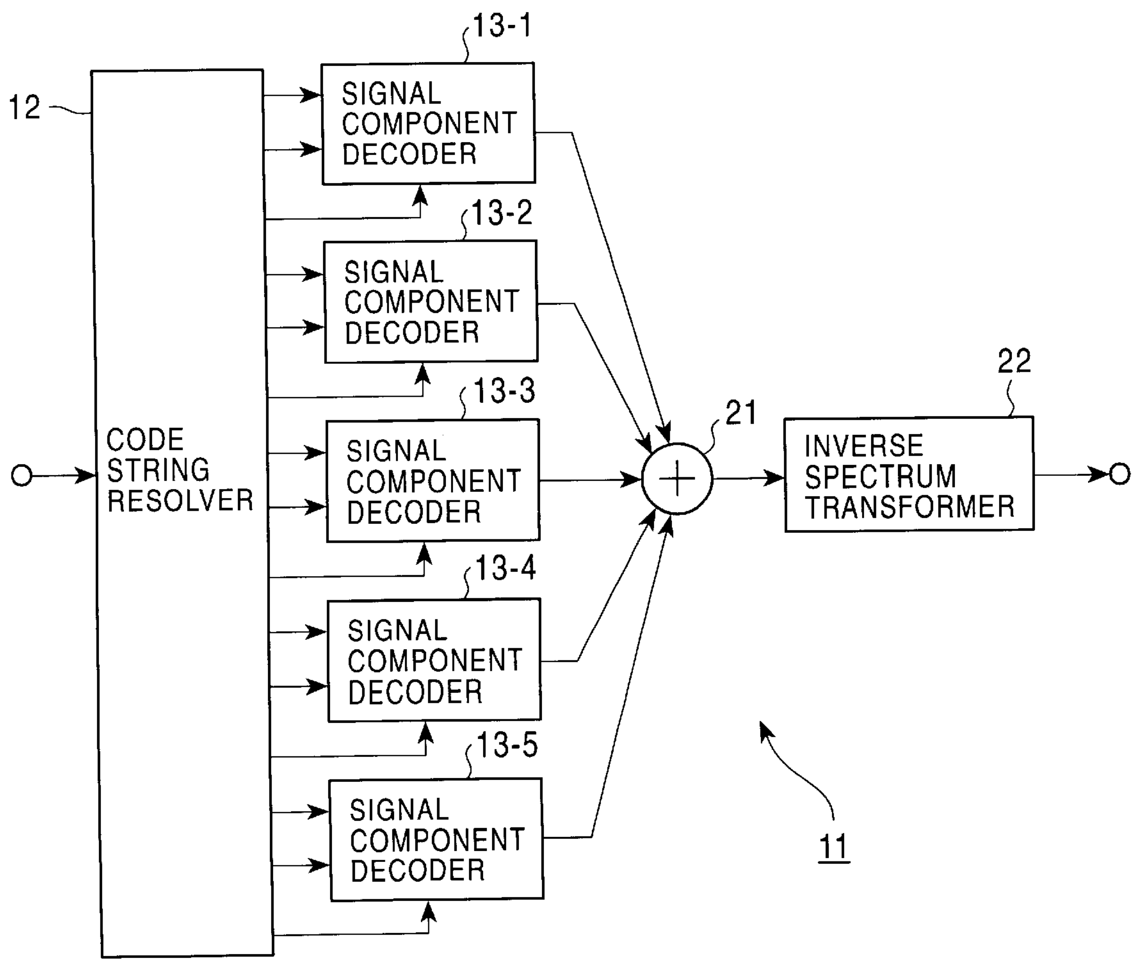
FIG. 1 is a block diagram showing a configuration of one embodiment of a decoding apparatus to which the present invention is applied.
Figure 5:
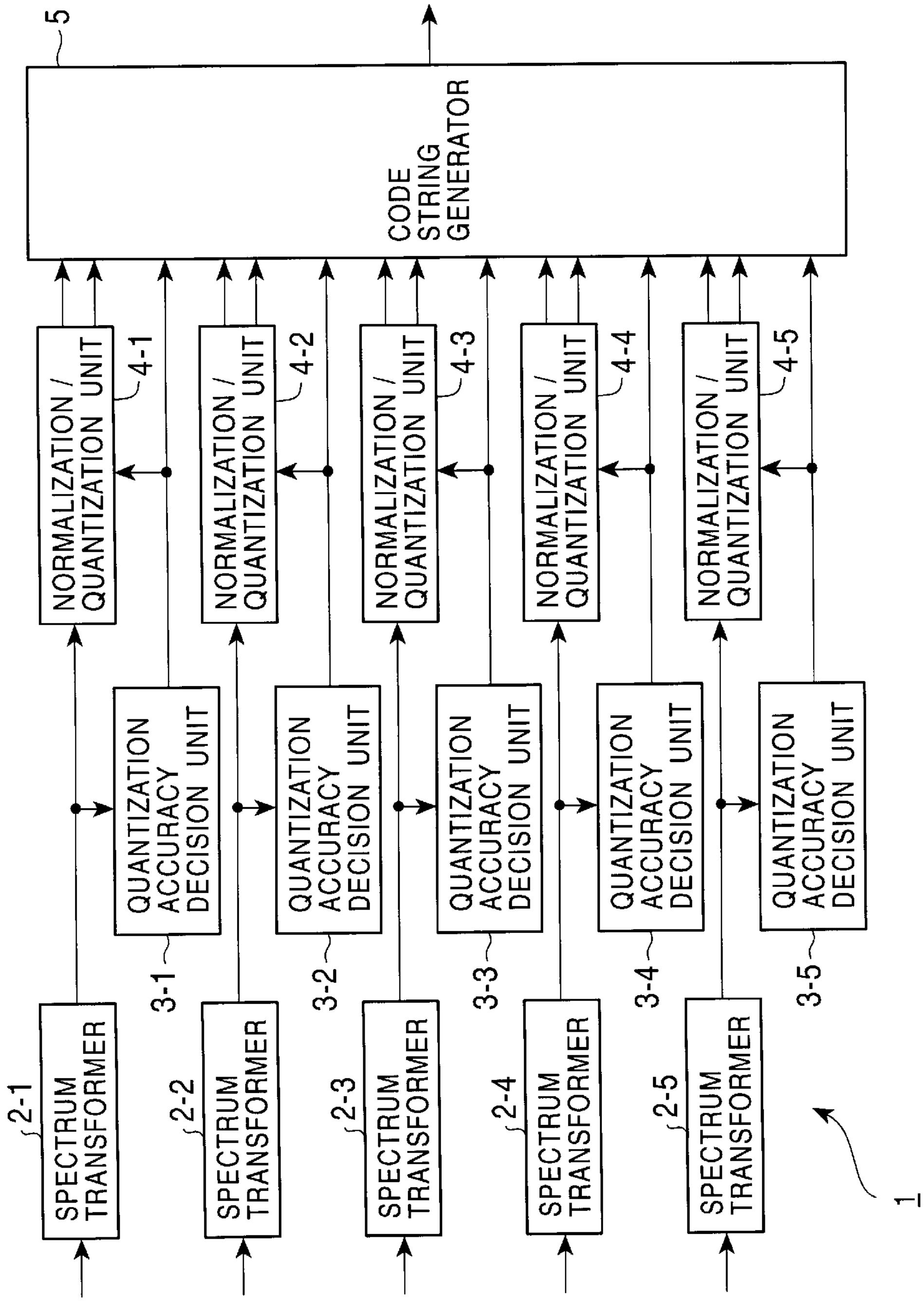
FIG. 5 is a block diagram showing of one example of a coding apparatus.
Figure 6:
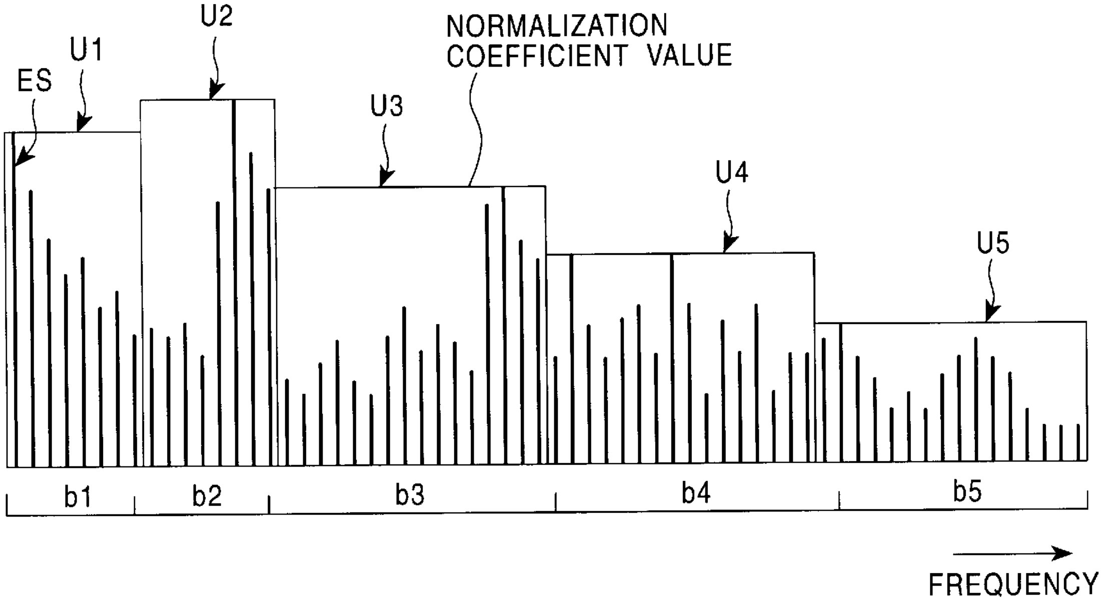
FIG. 6 is a graph for explaining spectrum signal components.
Figure 7:
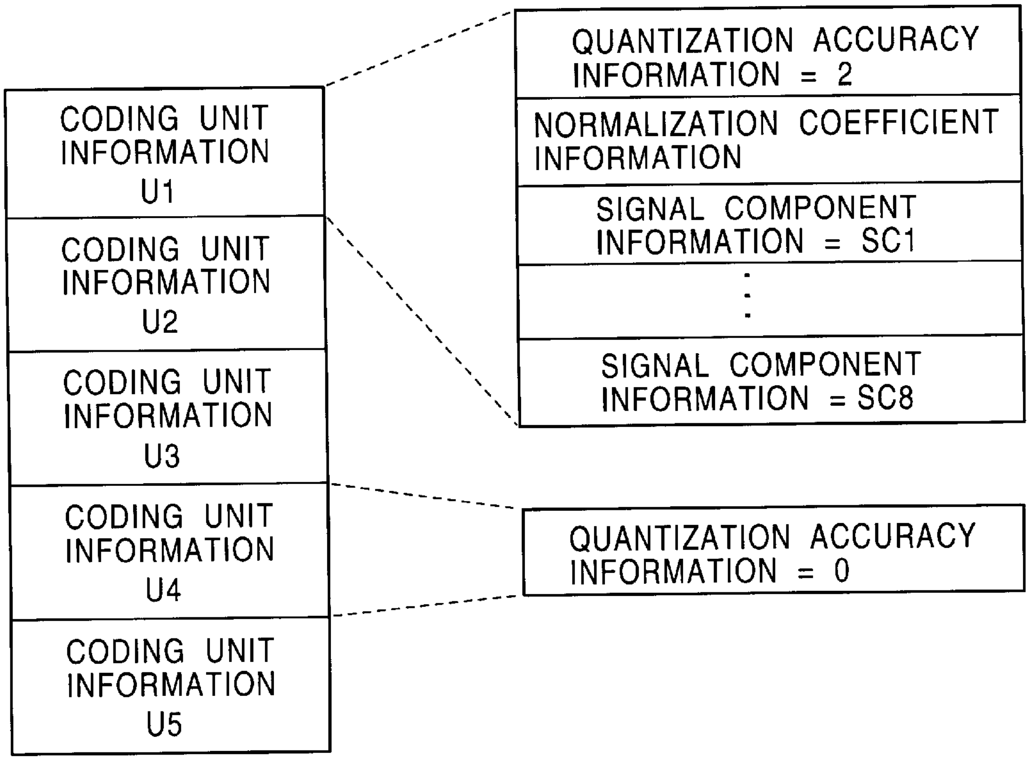
FIG. 7 is a representation for explaining a coding unit information.
Figure 8:
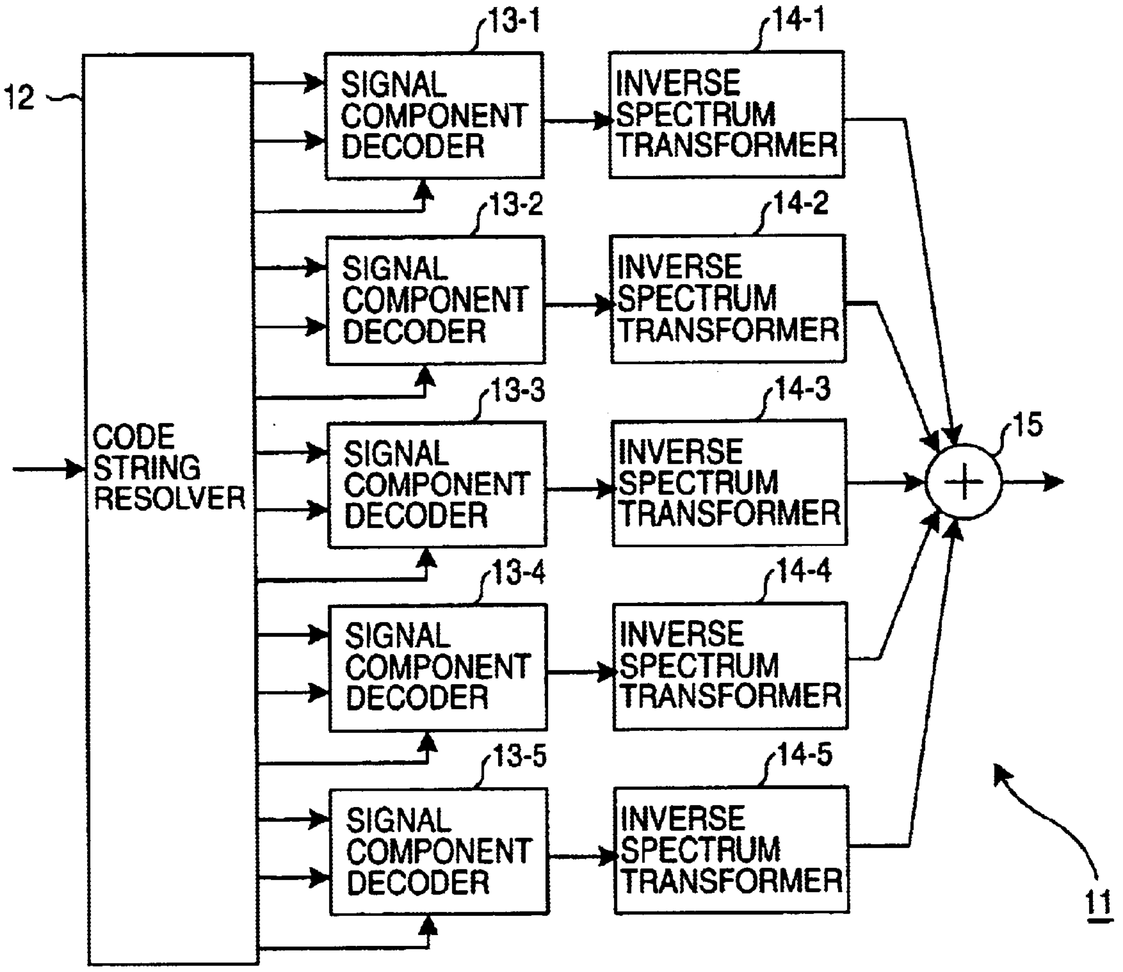
Fig. 8 (PRIOR ART)
FIG. 8 is a block diagram showing a configuration of one example of a conventional decoding apparatus.
Figure 9:
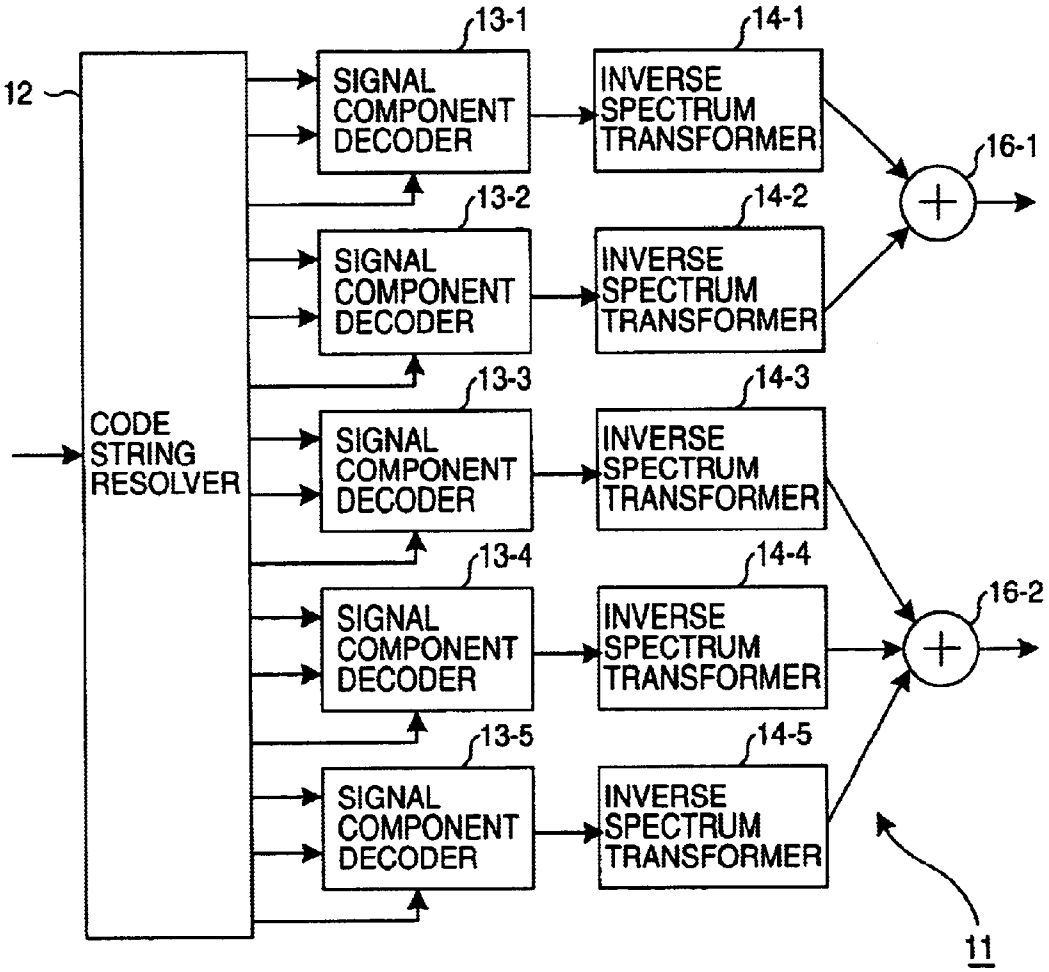
Fig. 9 (PRIOR ART)
FIG. 9 is a block diagram showing a configuration of another example of the conventional decoding apparatus.

FIG. 1 is a block diagram showing a configuration of one embodiment of a decoding apparatus 11 to which the present invention is applied. The decoding apparatus 11 shown in FIG. 1 is intended to decode a code string transmitted from the coding apparatus 1 having the configuration shown in FIG. 5. In other words, the decoding apparatus 11 is intended to output acoustic data of one channel from acoustic data of five channels which have been transmitted to it.

A code string inputted to a code string resolver 12 in the decoding apparatus 11 is resolved into code strings of respective five channels, and the resolved code strings are supplied to corresponding signal component decoders 13-1 to 13-5. Data of the code string inputted to the signal component decoder 13 includes quantization accuracy information, normalization coefficient information, and signal component information. Based on those inputted information, the signal component decoder 13 decodes signal components.

The signal components of five channels decoded by the signal component decoders 13-1 to 13-5 are inputted to an adder 21 and added together therein. An inverse spectrum transformer 22 carries out an inverse spectrum transform of a total signal component outputted from the adder 21, thereby producing acoustic data of one channel.

Figure 2:
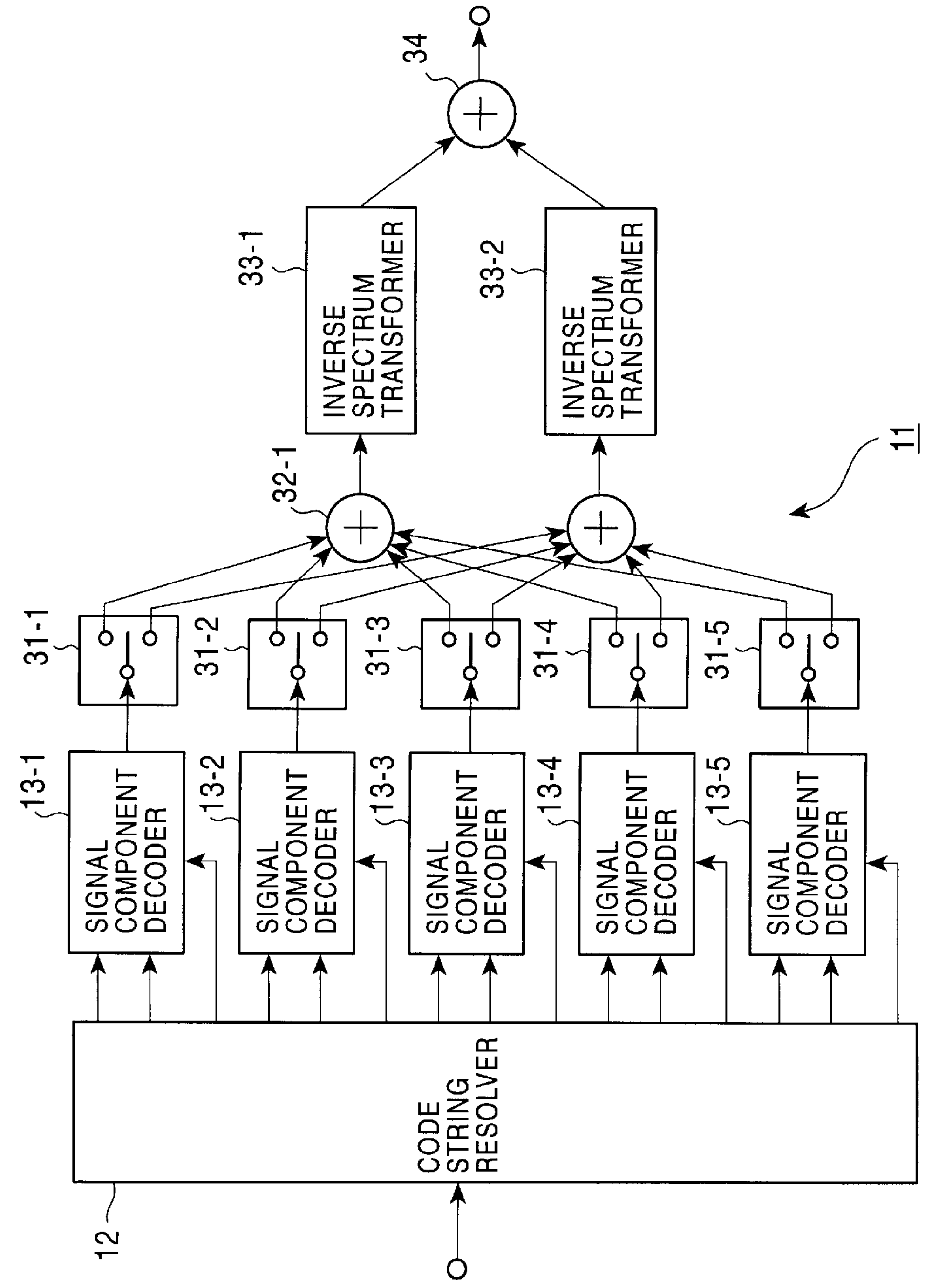
FIG. 2 is a block diagram showing another configuration of the decoding apparatus.

FIG. 2 is a block diagram showing another configuration of the decoding apparatus. In the configuration of FIG. 2, the signal components outputted from the signal component decoders 13-1 to 13-5 are applied respectively to corresponding switches 31-1 to 31-5. The switch 31 outputs the applied signal component to an adder 32-1 or adder 32-2.

An added signal component outputted from the adder 32-1 is inputted to an inverse spectrum transformer 33-1, and an added signal component outputted from the adder 32-2 is inputted to an inverse spectrum transformer 33-2. The signal components inputted to the inverse spectrum transformers 33-1 and 33-2 are each subjected to an inverse spectrum transform, and resulting respective acoustic data are outputted to an adder 34. The adder 34 adds the applied acoustic data together and outputs acoustic data of one channel.

In a coding apparatus 1 (see FIG. 5), acoustic data is coded in consideration of a pre-echo. The term "pre-echo" means a phenomenon that because quantization noise generated upon quantizing a frequency signal spreads throughout in the direction of the time base of the signal analyzed, the quantization noise generated in the first half attributable to a time signal having a small amplitude in the first half and having a large amplitude in the second half is perceived without masked by the signal.

Figure 3A:
FIGS. 3A, 3B and 3C are illustrations for explaining the case of employing different conditions for a time-frequency transform.
Figure 3B:
Figure 3C:

To reduce pre-echo effects, it is often performed, for example, to selectively employ two kinds of time-frequency transform conditions. As shown in FIG. 3, when one of the transform condition providing a long continuous analysis window (FIG. 3A) and the transform condition providing a short continuous analysis window (FIG. 3B) is selectively employed depending on signal properties, a transform result is obtained as shown in FIG. 3C. By thus using the transform conditions providing a plurality of analysis windows and cutting a signal into different lengths depending on signal properties, the pre-echo effects can be reduced.

In the case of employing a plurality of analysis windows to reduce the pre-echo effects, when acoustic data of multiple channels are outputted after being summed up into data of one channel on the decoding side, the signal frequency components under the same transform condition must be added together. In the decoding apparatus 11 shown in FIG. 2, therefore, the switches 31 are switched over so that the signal frequency components under the same transform condition are added together by one of the adders 32-1 and 32-2.

Figure 4:
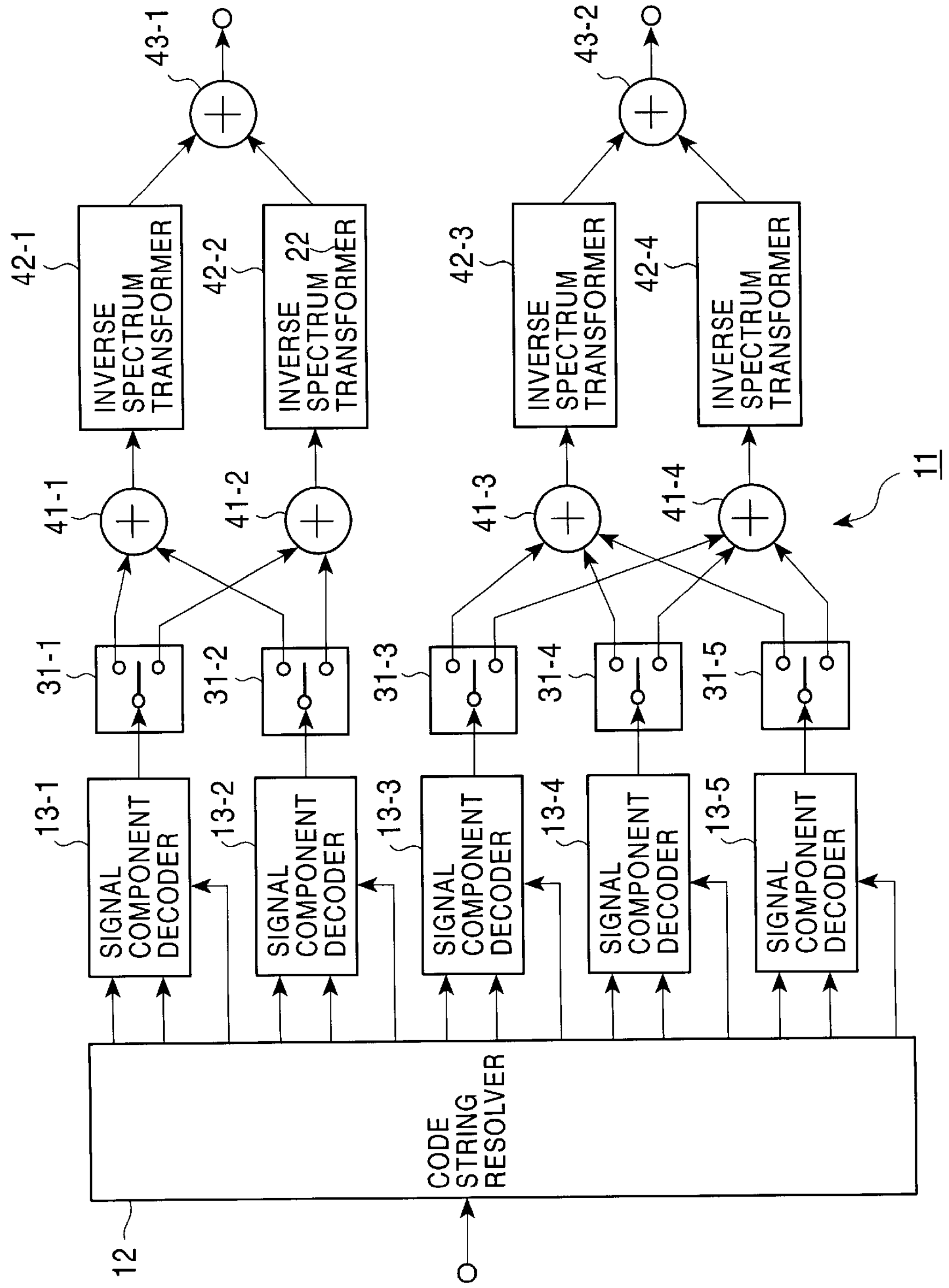
FIG. 4 is a block diagram showing still another configuration of the decoding apparatus.

While the decoding apparatus 11 shown in FIG. 2 is intended to output acoustic data of one channel from acoustic data of five channels which have been applied to it, FIG. 4 shows a configuration of the decoding apparatus 11 intended to output acoustic data of two channels from acoustic data of five channels. In the configuration of FIG. 4, the signal components outputted from the switches 31-1 and 31-2 are supplied to an adder 41-1 or 41-2, and the signal components outputted from the switches 31-3, 31-4 and 31-5 are supplied to an adder 41-3 or 41-4.

The adders 41-1 to 41-4 each add the applied data together, and output resulting data to corresponding inverse spectrum transformers 42-1 to 42-4, respectively. Then, the acoustic data outputted from the inverse spectrum transformers 42-1 and 42-2 are applied to an adder 43-1, whereas the acoustic data outputted from the inverse spectrum transformers 42-3 and 42-4 are applied to an adder 43-2.

As one example, the acoustic data outputted from the adder 43-1 is employed for a right channel and the acoustic data outputted from the adder 43-2 is employed for a left channel. Thus, in the decoding apparatus 11 shown in FIG. 4, the signal frequency components under the same transform condition are applied to the same adder 41 as with the decoding apparatus 11 shown in FIG. 2.

The above embodiments have been described as outputting acoustic data of one or two channels from acoustic data which are assumed to be reproduced with speakers for five channels. But the present invention is also applicable to the case of outputting acoustic data of channels in other number than one or two. Further, acoustic data of a particular channel may be added to other output acoustic data of multiple channels, or may be multiplied by a coefficient when added.

In addition, the present invention can also be similarly applied to the case of outputting acoustic data comprised of plural acoustic objects as acoustic data of channels in number less than the number of the acoustic objects.

With the decoding apparatus embodying the present invention, since a plurality of applied signal frequency components are subjected to a frequency-time transform (inverse spectrum transform) after being added together, the circuit scale of the decoding apparatus can be reduced.

It is to be noted that a providing medium for providing, to users, a computer program to execute the processing described in this specification includes not only information recording media such as magnetic disks and CD-ROMs, but also transmission media via networks such as the Internet and digital satellites.

According to the decoding apparatus, the decoding method and the providing medium of the present invention, as described above, a received code string resolved into signals of m channels, and respective signal frequency components are outputted from the resolved signals of m channels. The outputted signal frequency components of m channels are added to provide signals of n channels less than the m channels. A frequency-time transform is then carried out on each of the added signals of n channels. As a result, the circuit configuration of the decoding apparatus can be reduced.

What is claimed is:

1. A decoding apparatus for receiving a code string made up of coded input signals of m channels and outputting decoded input signals as signals of n channels less than the m channels, said decoding apparatus comprising:

receiving means for receiving said code string;

resolving means for resolving said code string received by said receiving means into code strings of m channels;

decoding means for decoding respective signal frequency components of m channels from the code strings of m channels resolved by said resolving means;

adding means for adding the signal frequency components of m channels outputted from said decoding means and outputting combined signal frequency components of n channels; and transforming means for carrying out a frequency-time transform on each of the combined signal frequency components of n channels outputted from said adding means.

2. A decoding apparatus according to claim 1, wherein when said code string is produced using a plurality of time-frequency transform conditions, said adding means adds the signal frequency components obtained under the same time-frequency transform condition.

3. A decoding method of receiving a code string made up of coded input signals of m channels and outputting decoded input signals as signals of n channels less than the m channels, said decoding method comprising:

a receiving step of receiving said code string;

a resolving step of resolving said code string received in said receiving step into code strings of m channels;

a decoding step of decoding respective signal frequency components of m channels from the code strings of m channels resolved in said resolving step;

an adding step of adding the signal frequency components of m channels outputted from said decoding step and outputting combined signal frequency components of n channels; and a transforming step of carrying out a frequency-time transform on each of the combined signal frequency components of n channels outputted from said adding step.

4. A providing medium for providing a computer-readable program to a decoding apparatus for receiving a code string made up of coded input signals of m channels and outputting decoded input signals as signals of n channels less than the m channels, thereby rendering said decoding apparatus to execute processing comprising:

a receiving step of receiving said code string;

a resolving step of resolving said code string received in said receiving step into code strings of m channels;

a decoding step of decoding respective signal frequency components of m channels from the code strings of m channels resolved in said resolving step;

an adding step of adding the signal frequency components of m channels outputted from said decoding step and outputting combined signal frequency components of n channels; and a transforming step of carrying out a frequency-time transform on each of the combined signal frequency components of n channels outputted from said adding step.

* * * * *